March 30, 1965 R. R. WARD 3,175,380
KEY HOLDER
Filed March 1, 1963
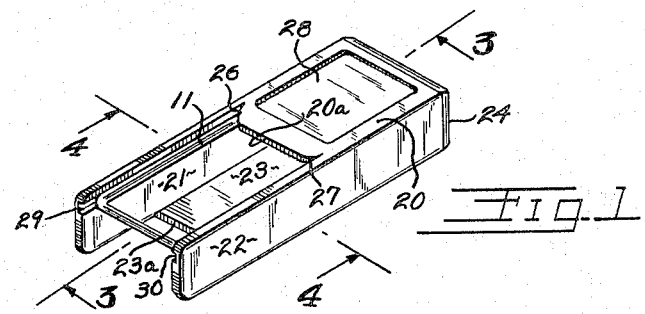
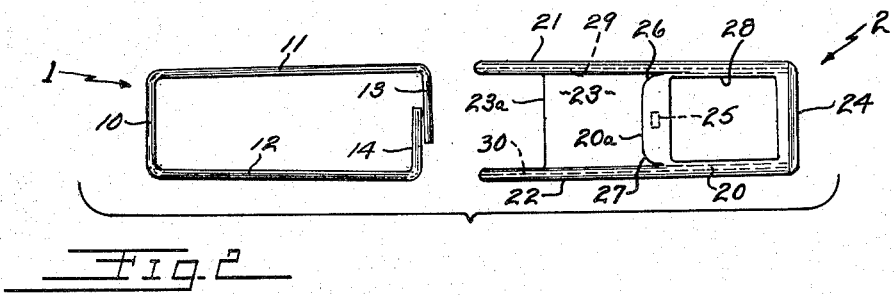
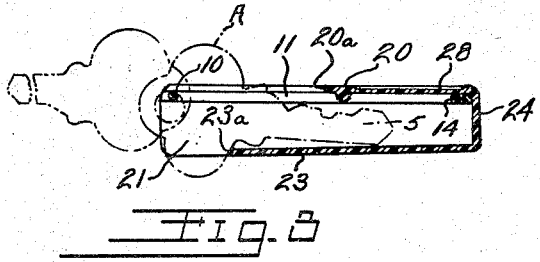
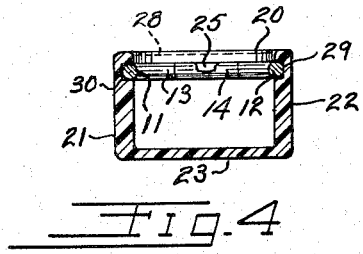
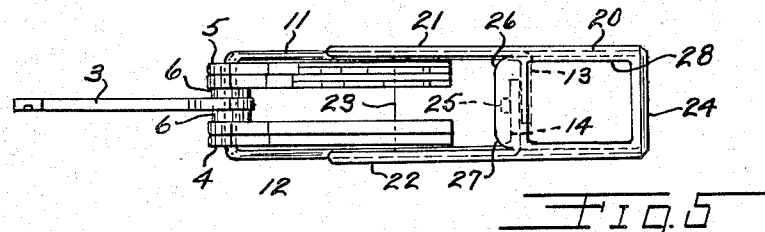
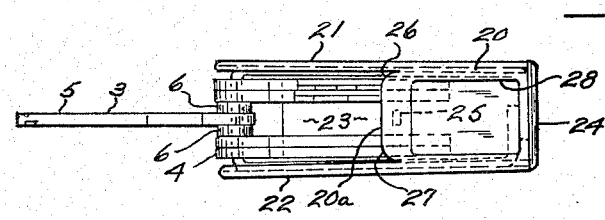
INVENTOR.
RAYMOND R. WARD
BY
Meyer, Baldwin, Doran & Egan
ATTORNEYS

United States Patent Office 3,175,380
Patented Mar. 30, 1965

3,175,380
KEY HOLDER
Raymond R. Ward, Cleveland, Ohio, assignor to Ray-Craft, Inc., Cleveland, Ohio, a corporation of Ohio
Filed Mar. 1, 1963, Ser. No. 262,168
9 Claims. (Cl. 70—456)

This invention relates to a key holder for compactly encasing a plurality of keys whereby the keys may be conveniently carried in a pocket or purse.

The invention has for its primary object the provision of a device of the aforesaid nature which is characterized by its structural simplicity, its inexpensive manufacturing costs, the ease of assembly of its parts, the attractive forms in which the device may be made, and the particularly effective manner in which it performs its function.

A more specific object of the invention is to provide a key holder comprising an open-ended housing carrying a movable key retaining bar which optionally projects beyond said housing or retracts within said housing.

Another object of the invention is to provide a key holder as set forth above in which the key retaining bar is integrally formed with a pair of spring arms which slidably and frictionally engage inner wall surfaces of the housing to retain said bar in any slidably adjusted position.

A further object of the invention is to provide a key holder having the above characteristics wherein groove or way means are provided in said inner wall surfaces for slidably receiving the spring arms and guiding their longitudinal movement.

Yet another object of the invention is to provide such a key holder in which said integrally formed key retaining bar and spring arms carry means for releasably engaging stop means on said housing whereby said key retaining bar and spring arms are normally limited in their outward movement from said case.

Further objects of the present invention and a number of its advantages will be referred to in or will be evident from the following description of one embodiment of the invention, illustrated in the accompanying drawings, in which:

FIG. 1 is a perspective view of the key holder of this invention;

FIG. 2 is a top plan, exploded view of the key holder of FIG. 1;

FIG. 3 is a longitudinal section of the key holder taken along the line 3—3 of FIG. 1;

FIG. 4 is a transverse section of the key holder taken along the line 4—4 of FIG. 1;

FIG. 5 is a top plan view of the key holder with the key retaining bar extended and keys mounted on said bar; and FIG. 6 is a top plan view of the key holder, similar to FIG. 5, with the key retaining bar retracted.

Referring now to the drawings and particularly to FIGS. 1 and 2, the key holder of this invention comprises a key retaining member generally shown at 1 and a case or housing generally shown at 2. As illustrated in the perspective view of FIG. 1, the key retaining member 1 is adapted to slidably interfit the housing 2.

The key retaining member 1, as herein illustrated is made from a single piece of relatively heavy gauge wire bent into a generally U-shaped form. Said member thus formed comprises a key retainer bar 10 and a pair of integrally formed, generally right angularly projecting spring arms 11 and 12. Said spring arms 11 and 12 have angularly bent portions at their distal ends which, as will be herein later fully described, afford integral catches 13 and 14 respectively. The catches 13 and 14 are so angled relative to the arms 11 and 12 that they overlap each other. The angles of intersection of the bar 10 and the arms 11 and 12 respectively are preferably slightly obtuse in such manner as to afford a moderate, lateral outward bias when the key retaining member 1 is inserted in the housing 2.

The housing 2 is generally rectangular in cross section and is open-ended to afford entrance means to receive the key retaining member 1. Said housing is generally elongated and comprises a front retainer wall 20, a pair of generally parallel, spaced side walls 21 and 22, a back retainer wall 23, and an end wall 24 opposite the open end thereof. The free edge of the back wall 23, shown at 23a, is spaced somewhat from the open end of the housing as defined by the distal ends of the side walls 21 and 22. The free edge of the front wall 20, shown at 20a, is spaced even further away from the open end, said edge being disposed about midway between the ends of the side walls 21 and 22. The housing 2 is preferably integrally formed from a semirigid plastic or a material having similar characteristics.

Adjacent to the free edge 20a of the front wall 20, on the inner surface of said wall, there is provided a small protuberance or boss 25. Said free edge is cut away in the areas of intersection with the side walls 21 and 22 to afford generally V-shaped notches 26 and 27 in general lateral alignment with the boss 25. This affords a slight flexibility to the portion of the front wall 20 which is adjacent to the free edge 20a.

The outer surface of the front wall 20, as herein illustrated, is provided with a rectangular recess 28. Said recess may be utilized for mounting therein a small plate or sheet containing various advertising matter, identification names or initials, or an attractive decorative pattern.

The side walls 21 and 22 are provided at their inner surfaces with longitudinal grooves or ways 29 and 30 respectively. Said grooves extend the full length of the side walls and are disposed just behind or closely adjacent to the front wall 20. As well shown in FIG. 4, the boss 25 of the front wall 20 projects downwardly or inwardly from said front wall into the general plane defined by the grooves 29 and 30.

In the assembled condition, the key retaining member 1 is slidably disposed within the housing 2 with the spring arms 11 and 12 longitudinally disposed within the grooves 29 and 30 respectively. Said key retaining member is normally disposed with the key retainer bar 10 positioned across the open end of the housing 2 adjacent to the distal ends of the side walls 21 and 22. The arms 11 and 12 extend in the direction of the end wall 24 beneath or behind the front wall 20 whereby the catches 13 and 14 are disposed longitudinally between said end wall and the boss 25. Due to the inherent resilience of the key retaining member 1, the catches 13 and 14 are flexible and upon assembly of the parts can be caused to pivot inwardly and snap over the boss 25 merely by the application of increased pressure in pushing the retaining member into the housing. This snap-over action is further facilitated by the slight flexibility of the portion of the front wall 20 which carries the boss 25.

Once the key retaining member 1 and the housing 2 are assembled as illustrated in FIG. 1, said key retaining member is longitudinally slidable from a retracted position as illustrated in FIG. 6, with the catch 13 abutting the inner surface of the end wall 24, to an extended position as illustriated in FIG. 5, wherein the catch 14 abuts the boss 45 of the front wall 20. Disassembly of the retaining member and housing is effected by an increased longtudinal pull on said retaining member which again causes the catches 13 and 14 to snap over the boss 25 whereby the key holder is disassembled.

It will be noted that when the key retaining member 1 is in the extended position, a substantial portion of the arms 11 and 12 remain in the grooves 29 and 30 of the side walls.

As herein illustrated, the side walls 21 and 22 converge slightly from the open end of the housing 2 in the direction of the end wall 24. As hereinbefore noted, the spring arms 11 and 12 define slightly obtuse angles relative to the key retainer bar 10 and are flexible. To insert the key retaining member into the housing, the arms 11 and 12 are compressed toward each other until they are such distance apart as to readily enter the grooves 29 and 30. As said retaining member is moved inwardly of the housing, the slight taper of the side walls 21 and 22 tends to effect a slight increase in the compression of said arms. The combined effect of the tapered walls and the outwardly biased arms 11 and 12 is to cause said arms to frictionally engage the side walls 21 and 22 at the grooves 29 and 30 thereof. Frictional engagement between the spring arms and side walls is sufficient to hold the key retaining member 1 in the retracted position within the housing 2. The catches 13 and 14 releasably limit the outwardly extended position of said retaining member whereby the key holder cannot be inadvertently disassembled in ordinary use.

The key retainer bar 10 is adapted to pivotally mount one or more conventional keys 3, each key comprising the usual bow or loop portion 4 and elongated stem 5. To mount the keys, the key holder is disassembled as described above and the keys are inserted over either the catches 13 or 14 whereby they can be slid along either the arm 11 or 12 and ultimately positioned with their loop portions 4 telescoped over the key retainer bar 10. As shown in FIGS. 5 and 6, if fewer keys are mounted than are necessary to fill the key retainer bar 10, one or more simple, washerlike spacers 6 of any suitable material may be similarly mounted between the loop portions 4 of the keys to prevent rattling thereof.

Assuming that a plurality of keys 3 have been mounted upon the key retaining member 1 with said key retaining member and the housing in the assembled condition described above, all of the keys may be compactly disposed within the housing 2 for convenience in carrying the same. This is effected by pulling the key retaining member to the extended position of FIG. 5 wherein the keys 3 are pivotable about the key retainer bar 10 to a position wherein the stems 5 are postioned between the side walls 21 and 22 generally within said housing. The front wall 20 is disposed away from the open end of the housing a sufficient distance to allow the stems to enter the housing from the front, and the rear wall 23 is likewise cut back sufficiently to allow enlarged or irregularly shaped loop portions 4 adequate clearance when the key retaining member is moved to the retracted position of FIG. 6. In such retracted position, the distal ends of the stems 5 move behind the front wall 20 at which point the front and back walls serve as retaining walls for captively holding said stems therebetween. If so desired, a single key 3 may be left exposed for use when the key retaining member is retracted while all remaining keys are neatly and compactly stored within the housing 2.

It will be understood that many changes in the details of this invention as herein disclosed and illustrated may be made without, however, departing from the spirit thereof or the scope of the appended claims.

What is claimed is:

1. A key holder comprising an open-ended housing having opposite, generally parallel walls; means defining generally parallel grooves in the inner surfaces of said walls; key retainer means slidably disposed in said housing; said key retainer means having outwardly biased arm means disposed within said grooves; said key retainer means being slidably extendable out of said housing whereby keys carried by said key retainer means are accessible; and means limiting the outward movement of said key retainer means.

2. A key holder comprising an open-ended housing having opposite, generally parallel walls; means defining generally parallel grooves in the inner surfaces of said walls; a key retainer bar; a pair of generally parallel, resilient arms projecting generally at right angles from the ends of said bar; said arms disposed lengthwise in said grooves parallel therewith and resiliently pressing outwardly against said walls; said arms slidable longitudinally in said grooves whereby said bar is movable from a retracted position adjacent to the open end of said housing to an extended position outwardly therefrom; and means releasably limiting the outward movement of said arms.

3. A key holder comprising an elongated housing of generally rectangular cross section; at least one end of said housing being open; said housing having at least two generally parallel walls; means defining a longitudinal groove in the inner surface of each said wall which is generally parallel and opposite the groove in the other wall; a key retainer bar adapted to be disposed generally across the open end of said housing; said bar having integrally formed, resilient arms projecting from its ends in the same general direction and disposed generally at right angles to said bar; said arms disposed longitudinally in said grooves and biased outwardly against said walls; said arms being longitudinally slidable in said grooves whereby said bar is optionally extendable out of said housing; and means connected to said housing cooperant with means projecting from at least one of said arms releasably limiting the outward movement of said arms and said bar.

4. A key holder comprising an elongated housing of generally rectangular cross section; one end of said housing being open; said housing having two generally parallel, oppositely disposed side walls and two oppositely disposed retaining walls connecting said side walls; means defining generally parallel, longitudinal grooves in the inner surfaces of said side walls closely adjacent to one of said retaining walls; a generally U-shaped key retaining member comprising a key retainer bar and laterally biased spring arms projecting from the ends of said bar; said arms slidably disposed within said grooves with said bar generally disposed across the open end of said housing between said side walls in a retracted position; said arms having flexible catch portions projecting inwardly of said housing parallel with and adjacent to said one retaining wall; said one retaining wall having a boss projecting from its inner surface; one said catch portion abutting said boss when said member slides outwardly from said housing and normally limiting the outward movement thereof; said catch portions being sufficiently flexible to snap over said boss by an increased pull on said member whereby said member is removable from said housing for mounting keys on or removing keys from said bar.

5. A key holder as set forth in claim 4; said side walls converging slightly inwardly from the open end of said housing whereby said arms are increasingly compressed as said member slides inwardly of said housing.

6. A key holder as set forth in claim 4; said boss spaced inwardly from the open end of said housing whereby a substantial portion of said arms are normally retained within said housing when said member is extended outwardly.

7. A key holder as set forth in claim 4; said member being normally extendable outwardly a sufficient distance to allow keys carried by said bar to be pivoted with their stems directed toward said housing whereby when said member is retracted, the stem of the keys are disposed captively between said retaining walls.

8. A key holder as set forth in claim 4, said housing made of a semirigid material; said one retaining wall being shorter than said side walls with its edge spaced substantially away from the open end of said housing; said boss disposed adjacent to the edge of said one retaining wall; the edge portion of said one retaining wall being cut back adjacent to said side walls and disconnected therefrom whereby to afford a limited flexibility to the portion of said one retaining wall which carries said boss.

9. A key holder as set forth in claim 4; said housing integrally formed of plastic material and including an end wall opposite the open end thereof; the other said catch portion abutting said end wall when said member is in a retracted position thereby limiting the inward sliding movement of said member.

References Cited in the file of this patent
UNITED STATES PATENTS

| | | |
|---|---|---|
| 2,344,581 | Ziegeweid | Mar. 21, 1944 |
| 2,855,774 | Brunner | Oct. 14, 1958 |